United States Patent [19]

Park

[11] 4,425,799

[45] Jan. 17, 1984

[54] LIQUID CAPACITANCE PRESSURE TRANSDUCER TECHNIQUE

[75] Inventor: Kyong M. Park, Chatsworth, Calif.

[73] Assignee: Kavlico Corporation, Chatsworth, Calif.

[21] Appl. No.: 384,510

[22] Filed: Jun. 3, 1982

[51] Int. Cl.$^3$ ............................ G01L 9/12; H01G 7/00
[52] U.S. Cl. ..................................... 73/718; 29/25.41; 361/283
[58] Field of Search ............... 73/718, 724; 361/283; 29/595, 25.41

[56] References Cited

U.S. PATENT DOCUMENTS

| | | | |
|---|---|---|---|
| 4,120,206 | 10/1978 | Rud, Jr. ............................... | 73/718 |
| 4,169,389 | 10/1979 | Yasuhara et al. ..................... | 73/718 |
| 4,207,604 | 6/1980 | Bell ....................................... | 361/283 |
| 4,227,418 | 10/1980 | Bonner ................................. | 73/718 |
| 4,380,041 | 4/1983 | Ho ........................................ | 73/718 |

*Primary Examiner*—Donald O. Woodiel
*Attorney, Agent, or Firm*—Poms, Smith, Lande & Rose

[57] ABSTRACT

A pressure transducer for measuring the difference in pressures between two liquids, includes two very closely spaced plates, at least one of which is a diaphragm, and opposed conductive coatings on these two closely spaced plates. The space between the two plates is evacuated, and a low viscosity silicon oil is drawn in through a conduit to completely fill the space between the two plates. The conduit leading to the space between the plates is filled up to a certain point with the low viscosity fluid, and a thin membrane or bellows tightly seals this conduit. One of the two liquids, the pressure of which is to be measured, is channelled to the outer side of the membrane or bellows; and the other of the two liquids is conducted to the outer surface of the diaphragm of the pressure transducer. Two concentric capacitors are formed by the opposed conductive coatings, with an inner variable capacitor having substantial changes as the diaphragm flexes, and the outer reference capacitor having very little change; but both of the capacitors being separated by the same dielectric liquid.

11 Claims, 3 Drawing Figures

LIQUID CAPACITANCE PRESSURE TRANSDUCER TECHNIQUE

FIELD OF THE INVENTION

This invention relates to liquid-to-liquid differential capacitive pressure transducers.

BACKGROUND OF THE INVENTION

It has previously been proposed to make liquid-to-liquid pressure transducers, but the successful manufacture of an accurate and reliable pressure transducer of this type has presented serious problems. In the case of capacitive pressure transducers for measuring the pressure of gases, reliable transducers have been developed, and one such transducer is shown, for example, in U.S. Pat. No. 4,207,604, granted June 10, 1980, to the assignee of the present invention. However, when it is desired to measure the pressure between two liquids, certain problems arise. Initially, with the plates of the pressure transducer being spaced quite close together, in the order of ½ of a thousandth of an inch up to several thousandths of an inch, the fluid of which the pressure is to be measured, normally will not easily flow into and completely fill the space between the two plates. Of course, trapped air bubbles will create errors, when the trapped air expands or contracts with changes in temperature. In addition, if a separate reference capacitor is employed, the significant changes in capacitance of the transducer itself may make it difficult to match the capacitance of the transducer with that of the reference capacitor, particularly under variable conditions such as changing temperatures or the like. Further, the ratio of the variable to the fixed capacitor may change significantly when the transducer is liquid-filled, as compared with a gas filled transducer, and this may create problems in the calibration of the device.

Accordingly, a principal object of the present invention is to provide an inexpensive and reliable liquid-to-liquid capacitive pressure transducer.

SUMMARY OF THE INVENTION

In accordance with the present invention, a reliable liquid-to-liquid pressure transducer is provided by evacuating the very small space, in the order of ½ thousandths to 20 thousandths of an inch, between the plates of a capacitive pressure transducer, and completely filling this space with a low viscosity dielectric fluid. The conduit leading to the space between the plates of the transducer is also filled with the dielectric fluid, and this conduit is sealed with a very thin flexible membrane, or bellows. The pressure difference between first and second bodies of liquid is to be measured, and conduits are provided leading one of these two bodies of liquid to the other side of the membrane or bellows, and another conduit directs the second liquid to the outer surface of the diaphragm or diaphragms of the pressure transducer.

In accordance with additional features of the invention, (1) the two plates may be made from any suitable insulating hysteresis-free material, such as aluminum oxide, or glass, by way of specific examples, (2) the conduit leading to the space between the plates may contain a thin rubber bellows, (3) the reference capacitor may be mounted on one of said plates, along with the variable capacitor, with the variable capacitor being mounted toward the center of the diaphragm or diaphragms, and the comparable area reference capacitor being mounted adjacent the periphery thereof, with both capacitors having the dielectric fluid between their plates; (4) one of the insulating plates may be substantially thicker than the other, and a hybrid electronic circuit or other output circuit may be mounted on this thicker plate, and (5) the inner transducer unit may be sealed to the sources of liquid, the differential pressure of which is to be measured, by appropriate housings and sealing gaskets or O-rings.

Advantages of the present invention include the fact that the ratio of the reference capacitor to the variable capacitor is very nearly the same for both the new liquid filled transducer and for the unit when it is air filled or is evacuated. In addition, by completely filling the space between the two plates, measuring only a fraction of a thousandth of an inch up to a few thousandths of an inch, so that there are no air bubbles, and by providing both the reference and the variable capacitor with a comparable oil spaced environment, undesired departures from linearity, temperature stability, and many of the difficulties previously encountered with liquid-to-liquid capacitive pressure transducers have been overcome.

Other objects, features and advantages of the present invention will become apparent from a consideration of the following detailed description, and from the accompanying drawings.

DETAILED DESCRIPTION

Figure 1:
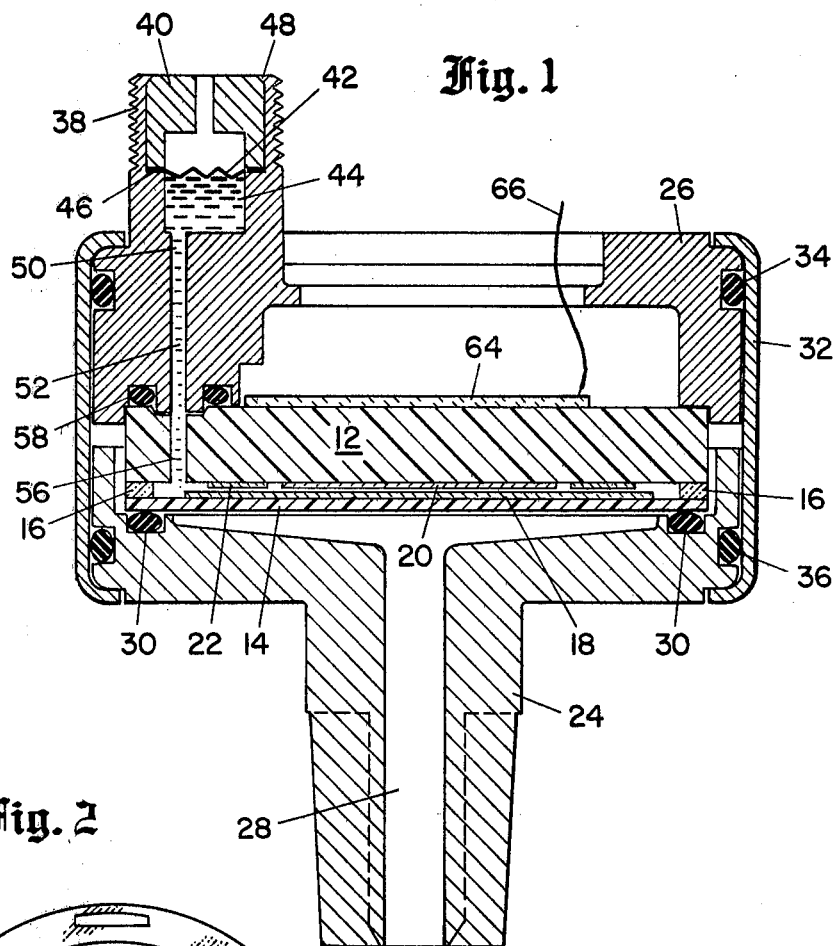
FIG. 1 is a cross-sectional view through the liquid-to-liquid transducer of the present invention.

Referring more particularly to the drawings, FIG. 1 is a cross-sectional view of the liquid-to-liquid transducer, showing two non-conductive plates 12 and 14 which form the heart of the transducer. The plates 12 and 14 may be made of any suitable insulating material which has low hysteresis and good stability. Typical materials which may be used include ceramic materials or glass. Operative embodiments have been made utilizing aluminum oxide, with the plates 12 and 14 being circular in their configuration. The two plates 12 and 14 could both be relatively thin so that they could act as diaphragms, or, as shown in FIG. 1, the plate 12 may be relatively thick, while the plate 14 may be very thin so that it may act as a single diaphragm, and flex when there are changes in pressure across its surface. Using aluminum oxide, the diaphragm 14 may be in the order of 10 or 20 thousandths of an inch in thickness, where the diameter of the plates is in the order of 1¼ inch. Incidentally, for completeness, reference is made to U.S. Pat. No. 4,207,604, granted June 10, 1980, U.S. Pat. No. 4,227,419 granted Oct. 14, 1980, and U.S. Pat. No. 4,329,732, to be granted on May 11, 1982. These three patents, which are assigned to the assignee of the present invention, disclose and describe in some detail capacitive transducers of the type shown in FIG. 1 of the present specification, but which are primarily intended for use in measuring the pressure of gases. However, with regard to the techniques for fabricating the assembly of two plates, at least one of which is a diaphragm, the disclosures of the three above-identified U.S. patents are hereby incorporated by reference.

Now, returning to FIG. 1, the two insulating plates 12 and 14 are spaced apart and sealed together by a peripheral layer of glass frit 16. The glass frit may be made of glass particles having two different melting points. With the firing of the glass frit being accomplished at a temperature intermediate the melting points of the two glasses included in the glass frit, the two plates 12 and 14 may be accurately spaced apart in accordance with the size of the particles included in the higher melting point glass frit. In practice, the spacing between the plates 12 and 14 may be in the order of from ½ of a thousandth of an inch up to about 20 thousandths of an inch, with a spacing of between one and two thousandths of an inch being practical for many applications.

Figure 2:
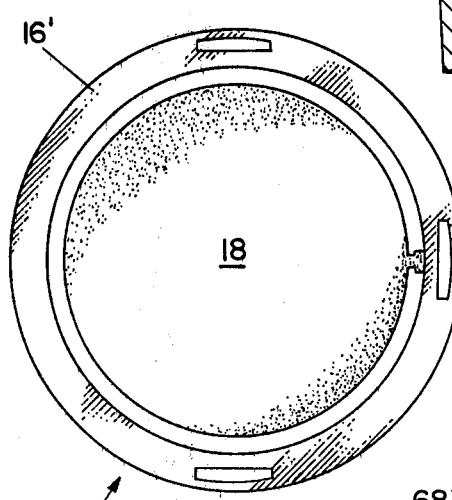
FIG. 2 is a plan view showing the diaphragm element included in the transducer of FIG. 1, together with its central conductive coating.
Figure 3:
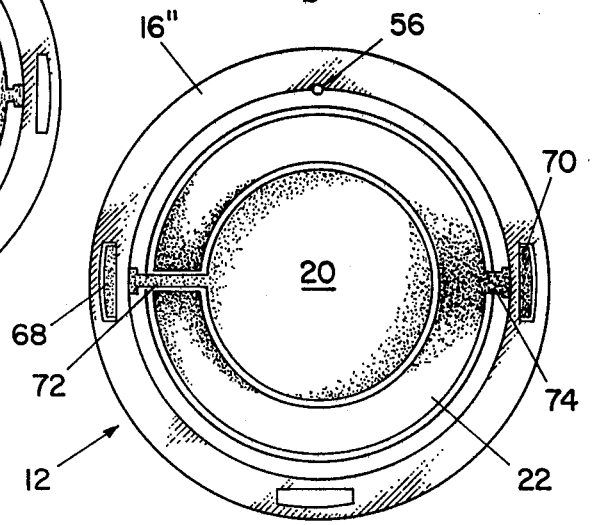
FIG. 3 is a plan view of the inner surface of the thicker plate of FIG. 1 together with the concentric conductive coatings forming a part of the reference and variable capacitance of the transducer.

On the inner opposed surfaces of the plates 12 and 14 are thin coatings of conductive material. These coatings may be screened onto the surfaces of the plates and fired. They may be screened on in the form of conductive pastes, or could be in the form of tin oxide, by way of specific examples. As better shown in FIGS. 2 and 3, the diaphragm 14 may be provided with a single large area substantially circular conductive coating 18, while the inner face of the thicker plate 12 may be provided with a central conductive coating 20 and an outer coaxial conductive coating 22 spaced around from the inner conductive area 20. The outer periphery 16' of the diaphragm 14, as shown in FIG. 2, and the outer periphery 16" of the plate 12 as shown in FIG. 3, are provided with a coating of glass frit, which is later fired to provide the seal 16 as shown in FIG. 1. In practice, commercially available glass frit in paste form may be screened onto the peripheral areas 16' and 16" as shown in FIGS. 2 and 3, and may be dried at a temperature of, for example, 100 degrees F. to 120 degrees F., and later fired, with the two areas 16' and 16" in engagement with one another to form the seal 16 as shown in FIG. 1.

The conductive areas 14, 20 and 22 are normally prepared by screening conductive material in paste form onto the aluminum oxide surfaces, and then firing the plates at an elevated temperature, as noted above.

Now, returning to FIG. 1, the assembly includes two additional housing members 24 and 26 which happen to be made of aluminum but could also be formed of a high quality, high strength plastic, for example. The aluminum member 24 is provided with a central conduit 28 through which one of the liquids, the pressure of which is to be sensed, is applied to the diaphragm 14. An O-ring 30 is provided to seal the member 24 around the periphery of the outer surface of diaphragm 14. An outer cylindrical metal member 32 which may also be formed of aluminum, has its upper and lower edges deformed inwardly to hold the assembly including the housing members 24 and 26 in position and in engagement with the sensor 12, 14. The two additional O-rings 34 and 36 seal the member 32 to the housing members 24 and 26.

The housing member 26 is provided with threads 38 to which the second source of liquid, the pressure of which is to be measured, may be coupled. Within the threaded fitting 38 is an insert 40 which holds the rubber bellows member 42 in place within the conduit 44 against the shoulder 46 of the housing member 26. The insert 40 is held firmly in place by the deformed outer edges 48 of the threaded fitting 38. The conduit 44 is coupled to the space between the plates 12 and 14 by the opening 50 in the housing member 26 and by the central opening 52 in the housing member 26, which in turn is aligned with the opening 56 extending through the thicker plate 12 of the sensor. The housing member 26 is sealed against the upper surface of the plate 12 by the O-ring 58.

In practice, the entire space between the plates 12 and 14 and in the channels 44, 50, 52 and 56 is evacuated, and then a low viscosity silicon oil is drawn into this entire volume, to completely fill the space between plates 12 and 14 and the passageway up through to the area 44. The rubber bellows member 42 is then inserted, the clamping member 40 is tightly forced down on the periphery of the rubber bellows 42, and it is crimped into place by deformation of the lip 48. This step is taken because the very small spacing between plates 12 and 14 means that, if fluid were to be directly applied to the passageways 44, 50, 52 and 56, without prior evacuation, there would be many small air bubbles trapped within the space between plates 12 and 14. These air bubbles being expansible with changes in temperature, would most adversely affect any pressure readings which could be obtained. In view of the fact that the space between the plates is totally free of gas in view of the prior evacuation and resultant purging, this space may be referred to as a "vacuum gas purged zone".

Following the filling of the inner zone of the sensor with a low viscosity silicon oil, or other suitable dielectric fluid, then the unit may be installed, and the two liquids, the differential pressure of which is to be measured, are coupled to the threads 38 at the top of the unit and to the conduit 28 extending downwardly from the housing member 24. The outer surface of the downwardly extending portion of member 24 enclosing conduit 28 may also be threaded. With the pressure of the two fluids appearing directly across the diaphragm 14, its deflection will be determined directly by the differential pressure.

Now, as the diaphragm 14 deflects, the capacitance of the variable capacitor made up of the common conductive coating 18, and the central coating 20 on plate 12, will increase substantially, while the capacitance of the reference capacitor including the common plate 18 and the outer conductive coating 22 will only increase by a small amount.

As disclosed for example in U.S. Pat. No. 4,227,419, it is customary to have a substantially fixed reference capacitor and a variable capacitor, and to determine the input pressure or the differential pressure applied to a capacitive sensor by the difference in capacitance between the variable and the reference capacitor. A circuit for accomplishing this function of this type is shown in FIG. 4 of the above-identified U.S. Pat. No. 4,227,419 in block diagram 4, and in greater detail in FIG. 8 of that same patent. This circuit is shown at Reference numeral 64 in FIG. 1 of the present drawing, and the leads from this circuit are shown at 66. Connections to the circuit 64, which represents a hybrid electronic chip, extend from points 68 and 70 in FIG. 3, with connections extending under the glass frit zone 16" along paths 72 and 74, respectively, to the conductive coatings 20, and 22. Small holes through the thicker plate 12 permit the passage of leads from points 68 and 70 up to the integrated circuit chip 64.

Now, heretofore, the reference capacitor was principally a separate element, and it was not physically exposed to the fluid filled space between the plates of the sensor. Under these conditions, the ratio of the variable capacitance to the reference capacitance could change drastically with temperature, in view of the different conditions obtaining at the reference capacitor as compared with conditions at the variable capacitor. Accordingly, calibration of the pressure sensor would be most difficult. By the present invention, however, where the reference and the variable capacitance are both located under identical conditions in contact with and speed apart by the dielectric fluid, such departures from linearity and other related difficulties are avoided.

Tests were performed using sensors substantially as shown and described hereinabove in connection with FIGS. 1 through 3 of the drawings, and the results of these tests are set forth in Table I and Table II which are set forth hereinbelow. In these tests, five sensors were constructed and tested, and these sensors were initially tested prior to filling with silicon oil, and they were again tested after having been filled with silicon oil, with an initial set of tests at different pressures being run 24 hours after the sensors had been oil-filled, and a second set of tests having been run 24 hours later, about 48 hours after the sensors were filled with oil. The results as set forth in Tables I and II are the results of the averages of the tests conducted with the five test pressure sensors.

TABLE I

| | AVERAGE CAP. VALUES (R.T.) | | | | | |
|---|---|---|---|---|---|---|
| | BEFORE FILLING WITH OIL | | AFTER FILLING WITH OIL | | | |
| | | | AFTER 24 HOURS | | AFTER 48 HOURS | |
| PRESSURE P.S.I.G. | $C_X$ | $C_R$ | $C_X$ | $C_R$ | $C_X$ | $C_R$ |
| 0.0 | 60.742 | 64.225 | 155.207 | 159.610 | 153.867 | 158.217 |
| 3.0 | 64.498 | 65.492 | 165.433 | 162.517 | 164.067 | 161.100 |
| 6.0 | 68.933 | 66.762 | 177.300 | 165.467 | 175.700 | 164.000 |
| 9.0 | 74.142 | 67.927 | 190.850 | 168.650 | 189.317 | 167.183 |
| 12.0 | 80.185 | 69.245 | 207.383 | 171.967 | 205.833 | 170.483 |
| 15.0 | 87.695 | 70.582 | 227.050 | 175.183 | 225.283 | 173.700 |

TABLE II

| | CAPACITANCE RATIOS $C_R/C_X$ | | |
|---|---|---|---|
| | BEFORE FILLING WITH OIL | AFTER FILLING WITH OIL | |
| PRESSURE P.S.I.G. | RATIO | RATIO 24 HOURS | RATIO 48 HOURS |
| 0.0 | 1.057 | 1.028 | 1.028 |
| 3.0 | 1.015 | 0.982 | 0.982 |
| 6.0 | 0.969 | 0.933 | 0.933 |
| 9.0 | 0.916 | 0.884 | 0.883 |
| 12.0 | 0.864 | 0.829 | 0.828 |
| 15.0 | 0.805 | 0.772 | 0.771 |

As can be seen from Table I, the absolute value of the capacitance, both for the variable and for the reference capacitor changes by a factor of about 2½, when the space is filled with the dielectric fluid. However, as indicated in Table II, the ratio of capacitance before and after filling with oil changes only very slightly. This very small change is of great assistance in designing circuitry and in calibrating the pressure devices so that the circuitry used either with air, or with different dielectric constant liquids may be substantially the same. Also of interest if the fact that the values are very nearly constant and stable, with the passage of time.

It may also be noted that the diaphragm 14 is shown in FIG. 14 as being somewhat thicker than its actual thickness, and this is also true of the conductive coatings 18, 20 and 22. As a matter of interest, the liquid-to-liquid pressure transducer may be employed in chamical process systems where the difference in pressure between two closed chambers or volumes is to be measured. One typical application could be the monitoring of pressure across a filter, where the pressure builds up as the filter becomes charged with particles. Concerning another matter, the reference and the variable capacitor are of substantially equal areas and value, so that under zero differential pressure conditions, the ratio of the two capacitance values is nearly unity. This is convenient for the adjustment of the associated output electronic circuit, and for consistency when the transducers have different dielectric material between the plates.

In conclusion, it is to be understood that the present invention is not to be limited to that precisely as described hereinabove and as shown in the accompanying drawings. More specifically, instead of using a separate insert 54 as shown in FIG. 1, such structure could be built into the member 26; instead of the circular plates of aluminum oxide which were actually used in the arrangements of FIGS. 1 through 3, square glass plates of the type shown in U.S. Pat. No. 4,329,732, cited above, could be employed; and output circuits other than the arrangements as described in connection with the electronic chip 64 could be employed. In addition, it is to be understood that the dimensions as included in the present disclosure may be varied, to accommodate the different pressure ranges which may be employed, and the different materials which may be utilized. Accordingly, the present invention is not limited to the structural arrangement precisely as shown and described hereinabove.

What is claimed is:

1. A capacitive sensor for measuring differential pressure between a first and a second liquid comprising:
   first and second flat insulating plates, at least one of said plates being a diaphragm;
   means for mounting said plates spaced apart from one another and sealed to one-another along a narrow zone spaced out from the center of said plates for facilitating free movement of said plates toward and away from one-another as the pressure across the diaphragm varies, the spacing between said plates being in the order of 0.5 to 20 thousandths of an inch,
   means including conductive coatings on the inner surfaces of the facing opposed portions of said plates for forming a variable capacitor located toward the center of said plates which changes substantially with changes in differential pressure, and a reference capacitor located outward from the center of said plates near said narrow zone, said reference capacitor only charging slightly with changes in capacitance;
   means for coupling and directing said first liquid to the outside of said diaphragm;
   a conduit containing a thin membrane or bellows; and
   a low viscosity dielectric fluid completely filling the space between said plates and said conductive coatings and filling said conduit up to and engaging said membrane or bellows;
   means for conducting and directing said second liquid to the other side of said bellows, whereby the changes in capacitance of said sensor directly indicate the pressure differential between said first and second liquid.

2. A capacitive pressure sensor as defined in claim 1 wherein said low viscosity fluid is a silicon oil.

3. A capacitive pressure sensor as defined in claim 1 wherein said variable and said reference capacitor have substantially the same area of conductive coating, and therefore have substantially the same capacitance at zero pressure differential across the diaphragm.

4. A capacitive pressure sensor as defined in claim 1 wherein the spacing between said plates is less than 5 thousandths of an inch.

5. A capacitive pressure sensor as defined in claim 1 wherein said plates are made of aluminum oxide.

6. A capacitive pressure sensor as defined in claim 1 wherein said plates are made of glass.

7. A capacitive pressure sensor as defined in claim 1 wherein one of said plates is at least several times thicker than the other, with the thinner plate being the diaphragm, and wherein said conduit includes a hole extending through the thicker plate adjacent to but inside said zone where said plates are mounted together and sealed to one-another.

8. A capacitive pressure sensor as defined in claim 7 further including an output electronic circuit chip mounted on said thicker plate.

9. A capacitive pressure sensor as defined in claim 1 wherein said membrane or bellows is a thin rubber bellows 10. A capacitive pressure sensor as defined in claim 1 wherein said space between said plates is a vacuum gas purged zone.

11. A method for manufacturing a capacitive pressure sensor for measuring differential liquid pressure between a first liquid and a second liquid, comprising:

applying conductive coatings to first and second insulating plates, at least one of which plates is a diaphragm, to form a reference and a variable capacitor when said plates are assembled;

assembling said first and second insulating plates, at least one of which is a diaphragm by firing a peripheral path of glass frit to space said conductive coatings on said plates apart by about from 0.5 to 20 thousandths of an inch;

evacuating the space between said plates and said conductive coatings;

providing a conduit extending to the space between said plates;

drawing a low viscosity dielectric liquid into the previously evacuated space between said plates, whereby the very limited space is completely filled with the dielectric liquid with no included air bubbles and with said dielectric liquid extending into said conduit;

mounting a thin very flexible membrane or bellows in said conduit in contact with the low viscosity liquid;

providing means for coupling said first liquid to the other side of said membrane or bellows; and providing means for coupling said second liquid to the outer side of said diaphragm;

whereby the deflection of said diaghragm and the resultant capacitance change reflects the difference in pressure between the first and second liquids.

* * * * *